(12) United States Patent
Bauer et al.

(10) Patent No.: US 7,043,715 B1
(45) Date of Patent: May 9, 2006

(54) METHOD AND APPARATUS FOR CUSTOMIZING SOFTWARE

(75) Inventors: Andreas L. Bauer, Acton, MA (US); Thomas M. Price, Shrewsbury, MA (US); Munish T. Desai, Shrewsbury, MA (US); Anthony M. Smith, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 359 days.

(21) Appl. No.: 09/587,783

(22) Filed: Jun. 6, 2000

(51) Int. Cl.
G06F 9/44 (2006.01)

(52) U.S. Cl. .................. 717/107; 717/163

(58) Field of Classification Search ............ 717/100, 717/102, 103, 106, 107–109, 163
See application file for complete search history.

(56) References Cited

U.S. PATENT DOCUMENTS

| | | | | |
|---|---|---|---|---|
| 5,600,778 | A | * | 2/1997 | Swanson et al. ............ 345/762 |
| 5,754,858 | A | * | 5/1998 | Broman et al. ............. 717/111 |
| 5,797,015 | A | * | 8/1998 | Daniels et al. ............. 717/163 |
| 5,903,859 | A | * | 5/1999 | Stone et al. ................... 704/8 |
| 5,995,757 | A | * | 11/1999 | Amberg et al. ............ 717/175 |
| 6,020,886 | A | * | 2/2000 | Jacober et al. ............. 345/709 |
| 6,252,589 | B1 | * | 6/2001 | Rettig et al. ............... 345/703 |
| 6,263,346 | B1 | * | 7/2001 | Rodriquez .................. 707/201 |
| 6,298,481 | B1 | * | 10/2001 | Kosaka et al. ............. 717/110 |
| 6,330,007 | B1 | * | 12/2001 | Isreal et al. ................ 345/762 |
| 6,384,923 | B1 | * | 5/2002 | Lahey ........................ 358/1.13 |
| 6,490,719 | B1 | * | 12/2002 | Thomas ..................... 717/107 |
| 6,490,723 | B1 | * | 12/2002 | Bearden et al. ............ 717/174 |
| 6,671,800 | B1 | * | 12/2003 | McInally et al. .............. 713/1 |
| 2002/0062405 | A1 | * | 5/2002 | Ayyagari .................... 709/331 |

OTHER PUBLICATIONS

Fowles, Ken, "International Mobilization for Windows 95", Jul. 1996, retrieved from http://www.microsoft.com/globaldev/gbl-gen/intw95d.asp on Dec. 12, 2002.*

Kano, Nadine, "TrueTyupe Open Extends Support for International Typography", Nov./Dec. 1995, MICROSOFT Developer Network News, http://www.microsoft.com/globaldev/gbl-gen/codesets/trutype.asp on Dec. 12, 2002.*

Riskin, Cindy, "Diversity in the Workplace: Developing for Both Windows 95 and Windows NT Version 4.0", Jul. 1996 retrieved from http://www.microsoft.com/globaldev/gbi-gen/inssync.asp, on Dec. 12, 2002.*

(Continued)

Primary Examiner—Wei Y. Zhen
Assistant Examiner—Mary Steelman
(74) Attorney, Agent, or Firm—Krishnendu Gupta; Robert Kevin Perkins

(57) ABSTRACT

There is disclosed improved apparatus and methodology for customizing software. With respect to GUI resources such as splash-screens, a dynamic link library containing a customer's customized resources and a default link library containing the manufacturer's default resources are prepared at design time. Source code is normally not included in the customized dynamic link library. At run time, the customer resources are automatically included by operation of a resource manager algorithm and appear on the computer terminal screen unless they were not made available initially in which case the equivalent default resource is shown on the screen. If there are any bugs which are induced by the customer's specifications to be corrected, or if the customized dynamic link library is changed for some other reason, the source code does not have to be rewritten as it is not included in the dynamic link library.

39 Claims, 7 Drawing Sheets

OTHER PUBLICATIONS

"Building for International", Apr. 1996, retrieved from http://www.microsoft.com/globaldev/gbi-gen/build.asp#binary on Dec. 12, 2002.*

Barrett, Mike, "HOWTO: Use the Preinstallation Kit for Large Deployment", Created Jun. 23, 1998, http://support.microsoft.com/default.aspx?scid=kb%Ben-us%3B24, retrieved on Apr. 8, 2003.*

Posey, Brien M., "Upgrading to MS Windows 98 The Easy Way", retrieved from www.microsoft.com, on Apr. 8, 2003.*

"Deploying Windows 98 using Batch 98 and Infinst.exe", p. 1-19, retrieved from www.microsoft.com, on Apr. 8, 2003.*

"Deploying Windows 98 Using Batch 98 and Infinst.exe", retrieved from http://support.microsoft.com/default.aspx?scid=kb%3Ben-us%3B241286, on Apr. 8, 2003.*

* cited by examiner

STANDARD GUI IMPLEMENTATION:
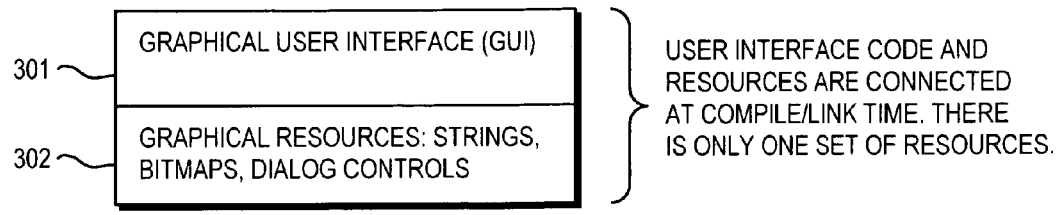
GUI IMPLEMENTATION WITH RESOURCE MANAGER:
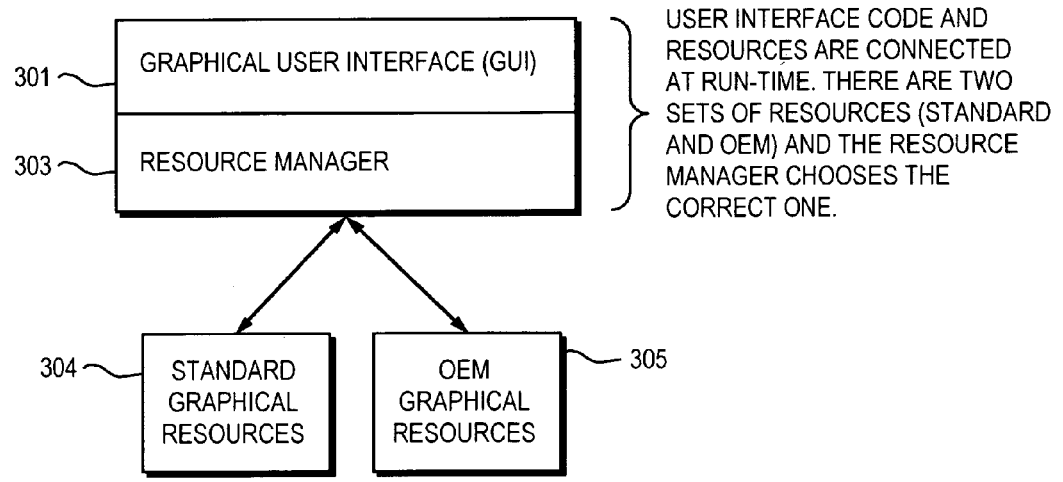
FIG. 3

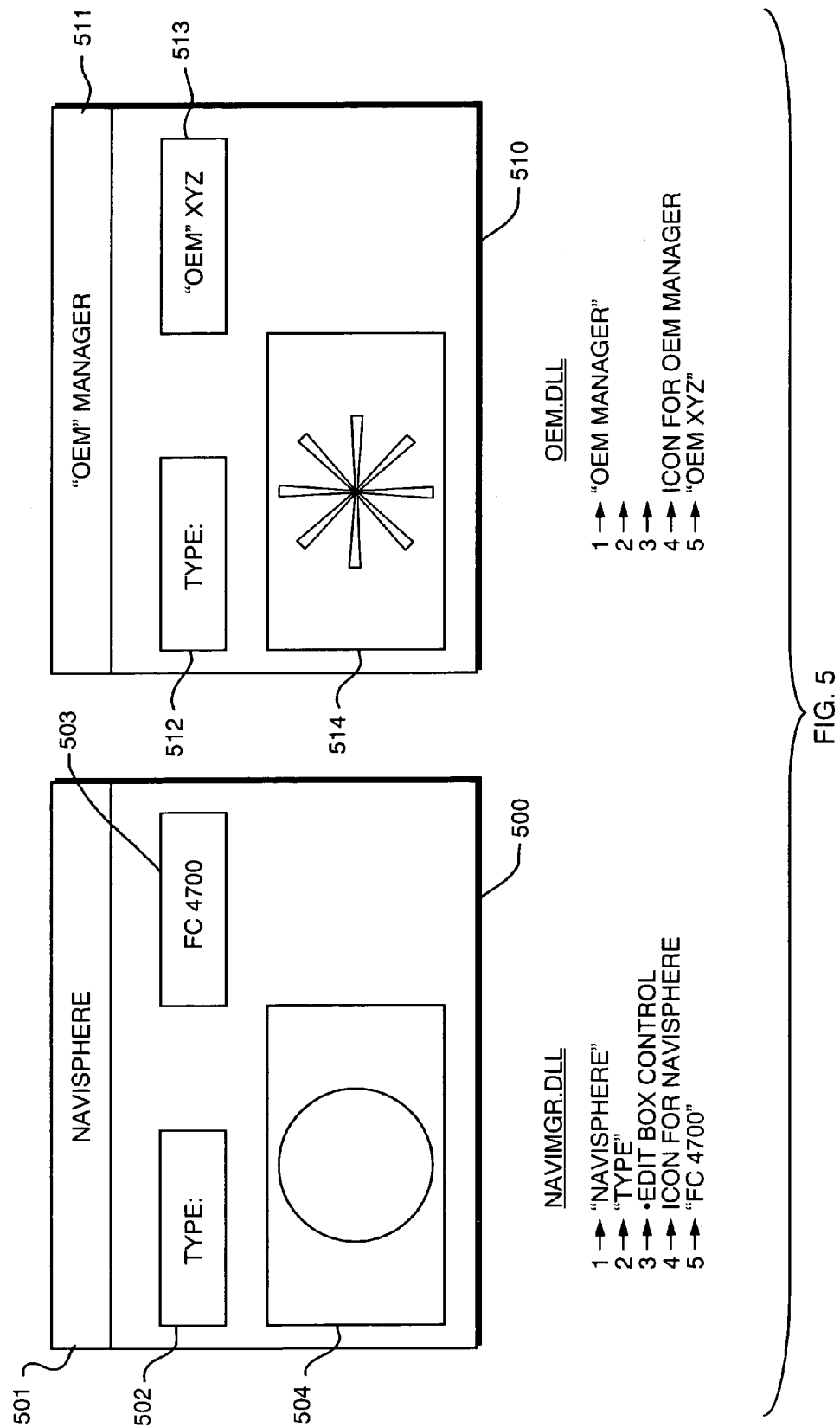

```
#include "NaviResourceManager.h"
....
// Initialize the resource manager.
CNaviResourceManager *pRscMgr = CNaviResourceManager::DestroyNaviResourceManager();
....
// Fetch a string from the resource manager.
CString csDisplayName = pRscMgr -> GetString( IDS_NFX_APPLICATION_TITLE );
// Fetch a bitmap from the resource manager.
HBITMAP hBitmap = (HBITMAP)pRscMgr -> GetImage( IDB_SPLASH_SCREEN );
// Use the resources....
....
//Deinitialize the resource manager.
CNaviResourceManager *pRscMgr = CNaviResourceManager::DestroyNaviResourceManager();
....
```

FIG. 6

METHOD AND APPARATUS FOR CUSTOMIZING SOFTWARE

CROSS REFERENCE TO RELATED APPLICATIONS

None.

BACKGROUND OF THE INVENTION

1. Field of the Invention

This invention relates generally to the field of utility software, and more particularly relates within that field to improved product release software which, at least, prepares customer-software to be automatically customizable by the customer at runtime.

2. Description of Prior Art

Before discussing prior art to the present invention, to place it in context refer to FIG. 1. There is depicted a software "field" showing three basic divisions of software: (1) Firmware or BIOS (Basic Input/Output System); (2) Operating System software; and (3) Applications software. The relationship of these various software categories to each other is generally suggested by their respective juxtapositions in the diagram. The firmware (BIOS) software is needed to get a computer system "booted-up" or turned on. The operating system runs on top of the BIOS and is needed to bring that computer system to "life", to enable it to run or operate—kind of the lifeblood of the computer system. The application software runs on the operating system software, and directs that computer system in a particular task of interest. A detailed discussion of each of the entries on the software field is not undertaken herein as each entry is self-explanatory. This software field is not complete and other software entries could have been made, known by names such as: daemons, processes, threads, API, sockets, algorithms, data structures, etc. Each of these other software names has special meaning in the software arts. Software depicted in FIG. 1, this other software, and yet other software not mentioned can all have a role to play in producing and controlling an operational computer by functionally-interconnecting with each other and with the computer system's firmware and hardware in a concerted effort to manage or control overall computer system operation in a manner to provide the result desired by the computer system human user. The present invention relates to a category of applications software known as "utilities" which is shown in FIG. 1, and relates to a particular type of utility software known as product release software—software which aids in readying or producing other software for consumer or customer usage on or within the customer's computer system.

Although the categories of application software are shown in the field as being isolated from each other for purposes of clarity of presentation, that is not necessarily the case. For example, the product release software within the utilities category is shown separated from the other categories of applications software, but it relates closely to the Tools category and could have been shown within or connected to that category under the more generic heading of a tool used to manage memory or storage such as disk arrays.

As is understood by those familiar with the computer arts, a human language such as English is used by programmers or software developers to create "files" and put commands and code in those files. These source code files are compiled by a compiler program into binary language understandable by the computer. There may be many source code files and each needs to be compiled. The compiled source code is called an object file. In order to construct a program one needs to combine or link all of the object files into a single file called the executable or binary file by way of a linker program. Not all of the object files contained in the executable or binary file are intended to be executed, although such non-executable files can remain within the binary file. Alternatively, some of the object files which were not intended to be executed can be combined by the linker into a different file such as a library file.

With any discussion focused primarily on computer programming and software, one could lose sight of ultimate computer system operation: regardless of size or complexity of the computer system or computer system network, including multiple layers of software, in every system electrons ultimately flow over conductive paths and through electrical nodes in a manner such that for every digital subsystem the nodes are either at a high voltage (high) or low voltage (low) at any given clock cycle (snapshot in time), and there could be multiple clocks. It is the controlling of each of these nodes or circuit-component-junctions, (e.g.: junctions between individual resistors and capacitors, junctions between individual transistors' emitters, bases or collectors and other active or passive circuitry, etc.), which may number possibly in the billions or even trillions per computer system when considering the huge number of integrated circuits that can be employed, to be either high or low at any specific point in time, and the controlling of how each one of these nodes changes from high to low and vice versa, which is the job of the various pieces of software on the computer system working in concert with each other. This concerted effort produces the desired result for the human computer user.

The prior art to the present invention includes utility software apparatus and methodology which human software developers use at "design-time"—at the time that source code is being written—to customize application software. (Software developers typically consider the development cycle to be divided into various "times" such as design time when the source code is written, code implementation time when at least compiling and linking are performed, kit time when the customer's kit is prepared, ship time when the kit and related software are shipped, and run time when the kit and related software are run normally at the customer's site.) This prior art utility software becomes an integral part of the application source code software and of its compiled binary intended for delivery to such customer-user. As an example of an application of this prior art utility software, consider the scenario where a computer company employs a team of software developers ("team" is intended to mean more than one person and can include people from the same department or from various departments within a single company or multiple companies) to develop graphical user interface (GUI) software to run on its own computer systems which it markets. Certain OEM (original equipment manufacturer) customers purchase those systems from the computer company but prefer to incorporate their own GUI nomenclature, (i.e. logo, splash-screen, etc.), so that when an OEM'S end user customer runs a system purchased from that OEM the GUI displays only that OEM's nomenclature and not any of the original computer company's nomenclature.

Prior art software employed in the GUI context includes usage of certain resource file(s) within the source code application software that define all visual elements or resources. (On a computer screen, for example, the "dialog box" is a resource, the "title bar" contained within the dialog box is a resource, etc.) In this prior art approach, resources can be changed, but only directly by developers at "design time" when the developers are constructing the software. Resources will be changed, for example, when a different visual look-and-feel is required for a different customer user. (In a specific example, a computer system and software provider would normally have its own logo or "splash-screen" as a visual resource that ships with the software, but an OEM customer purchasing such software and system would normally want to substitute its own OEM logo or splash-screen.) Because the prior art utility product release software was integrated into the source code of the application software to be shipped to the customer, this entailed rewriting vast portions of the entire application software source code, not only the resource files, each time a new customer wanted its own new computer screen image or each time an old customer wanted an update or revision to its old computer screen image. For example, in the prior art, the team of developers had to perform five separate steps to accomplish customization, namely: (1) write source code and imbed into this code the customization requested by the OEM/user/customer; (2) compile the source code to obtain binary files (as discussed); (3) link the files using a linker program (as discussed); (4) repeat steps 1, 2, 3 for every module needed; and (5) prepare the customer's kit installing the customized software onto a CD (compact disk). If any changes were required, all steps had to be performed, starting with rewriting the source code which is the most expensive step and a major challenge.

Other prior art challenges of a similar nature appear in the "Internationalization" arena. There are requirements for software (computer code) written in one human language, say English using the "Visual C++" computer language, to be translated into many foreign languages and/or foreign alphabets, such as, for example, Farci, Hebrew, Arabic, Greek, Russian, Japanese, Chinese and others, at least at the GUI level. In other words, English-language messages and icons on a computer screen may not normally be understood and therefore not normally be useful in a particular foreign country such as Turkey where Farci is spoken and it would therefore be very useful for a computer user/customer in Turkey to have such GUI icons and other GUI resources presented in Farci. In the prior art, these foreign-language GUI resources can be changed but, again, only directly by the developers in the source code at design time which presents the challenges and problems noted above.

Moreover, if a software bug was somehow introduced into the software development process at design time from a particular customer's particular specifications for its particular computer screen image (whether such specifications are resource-related or language-related or otherwise) but not detected until later, perhaps not until that software was shipped and run at that customer's site, then, in the meantime, such a bug could also infect other related software being customized for other customers. Resource files, for example, containing software reflecting customer specifications are intertwined with the source code and are not separately extractable and repairable. Thus, the only fix available would then be to rewrite entire portions of the source code for each and every infected customer to undo the bug. This prior art procedure for preparing application software for customer usage and for fixing bugs in such software was and is a large problem for software developers. As noted above, this prior art problem is particularly acute when there are a large number of different customer-users who each need to get their application software fixed because a particular bug is common to all customers' application software. In such a case, each users' software has to be individually rewritten which is a major headache.

In short, prior art disadvantages and problems arising from the intimate relationship between application software and these resources are derived from the following complexities: (1) when resources are changed, the complete application software has to be rebuilt and relinked; (2) resource changes may introduce bugs to the overall application software; and, (3) there is a considerable management effort required if several different resource files and application binaries with different built-in resources have to be maintained. What was badly needed was a solution to avoid this waste of effort, time and money caused by the necessity of rewriting source code and handling the complete application when bugs or like problems arise. The present invention provides such a welcome solution, to be described hereinbelow.

SUMMARY OF THE INVENTION

The present invention relates to an improved method and/or apparatus for customizing application software intended for a particular customer or user, such customer application software referred to hereinafter as "CAS". More specifically it relates to software developers packaging into such particular customer's CAS kit, at the end of the software development cycle and prior to software-shipment, customization-software capable of being run at "run time" when that customer installs and first runs the CAS that was developed and shipped to such customer.

In a first aspect of the present invention a default binary or executable file, which in a particular embodiment utilizes a dynamic link library (DLL) dynamically linked to the CAS, is established and contains a certain number of default resources. A customized dynamic link library dynamically linked to the CAS is also established and contains another number of customized resources (less than or equal to the number of default resources). The customized DLL need not have any source code in it. A resource manager is provided which the customer can employ at runtime to initially access the customized dynamic link library to obtain all desired customized resources and detect unavailability of any of the desired resources. Upon detection of unavailability of any resource the accessing of the customized dynamic link library is stopped and the accessing of the binary file or default dynamic link library is initiated to obtain the functional equivalent of that unavailable resource whereupon the accessing of the binary file or default dynamic link library is halted and the accessing of the customized dynamic link library is restarted. This continues until all desired customized resources that are available in the customized dynamic link library are obtained.

In another particular embodiment of the present invention, the customized dynamic link library and the default dynamic link library contain GUI resources, such as, for example: a dialog box, an icon such as a splash-screen icon; a bitmap, a string, etc.

In a further feature of the present invention, the customized dynamic link library does not contain any source code and contains only a collection of resources potentially desired by a particular user of the application software.

In another aspect of the present invention, an improved product-release methodology is provided for use, at design time, by computer software developers developing software product capable of subsequent customization by a subsequent user of the software. First, certain source code is written to obtain a portion of the software in an uncustomized source-code state. Then that portion is compiled to obtain an uncustomized file of that portion in object code. This source code writing and compilation process is repeated until all necessary uncustomized files are obtained in object code whereupon they are linked into a single module. The foregoing source code writing, compilation and linking is repeated until all required modules are obtained. Then, at kit time, a kit for that subsequent user is customized or prepared by packaging therein all of the required modules along with a dynamic link library which is customized in accordance with previously-supplied user specifications. The library is dynamically linked to at least one of the required modules and is accessible to the user, whereupon the product is released. Thereafter, upon receipt of the software product, the subsequent user can undertake to customize the software at runtime.

In such other aspect, the customization undertaken at runtime involves both a default binary or executable file which, for example, can utilize a dynamic link library having stored therein default information functionally corresponding to user information stored in the user dynamic link library and resource manager software for automatically selecting the user information when available but otherwise for selecting the default information functionally corresponding thereto. And, in this other aspect the dynamic link libraries can contain GUI resources such as bitmaps, dialog boxes and splash-screen icons.

It is advantageous to employ the present invention in software product development because it reduces the need for rewriting source code for each customer or user that may wish to have its software customized. For example, for multiple customers requesting GUI resource customization, each such customer's CAS would have the same source code but would each have a different kit containing a different dynamic link library. This is a far more efficient method and means of producing customizable CAS than was previously available.

Another advantage in employing the present invention is obtained in the event of software bugs that may be introduced by any customer's specifications, where those bugs would now be contained to that customer's dynamic link library and would not infect the source code. Before, in the prior art method of incorporating user specifications into the source code, contamination of the source code would result thus affecting all users'CAS.

It is thus a general object of the present invention to provide an improved methodology and apparatus for customizing application software.

It is another object of the present invention to provide an improved methodology and apparatus for customizing application software for various OEM customers having various specification requirements such as GUI requirements or foreign language and/or foreign alphabet requirements.

It is yet another object of the present invention to provide an improved methodology and apparatus for customizing application software which avoids the necessity of rewriting source code because of customer-induced software bugs.

It is a further object of the present invention to provide an improved methodology and apparatus for customizing application software in a manner that reduces inefficiencies and saves effort, time, human and machine resources and money.

Other objects and advantages will be understood after referring to the detailed description of the preferred embodiments and to the appended drawings wherein:

BRIEF DESCRIPTION OF THE DRAWINGS

FIG. 3 depicts the relationship of the software of the prior art to the GUI code in juxtaposition to the relationship of the software of the present invention to the GUI code;

FIG. 5 depicts two dialog boxes at "run time", one showing the software developer's default resources and the other showing a generic OEM customer's specified resources;

FIG. 6 depicts the type of code written in the Visual C++ language that is needed to use the resource manager depicted algorithmically in FIG. 4; and, FIG. 7 depicts operation of the code of FIG. 6 showing completion of the task for each resource prior to going to the next resource.

DETAILED DESCRIPTION OF THE PREFERRED EMBODIMENTS

Figure 1:
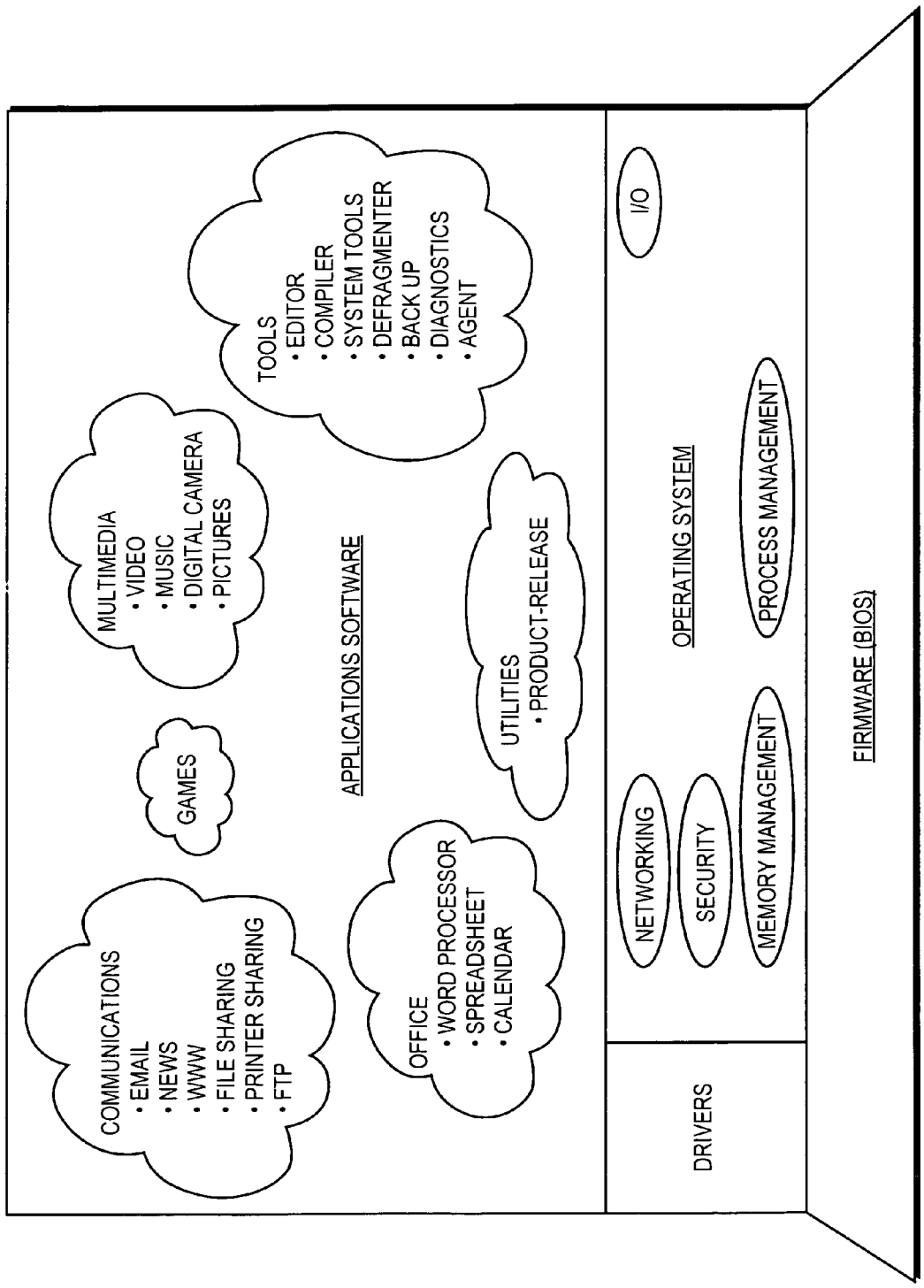
FIG. 1 depicts a software "field" showing the juxtaposition of various types of software and showing the category of software to which the present invention is related.
Figure 2:
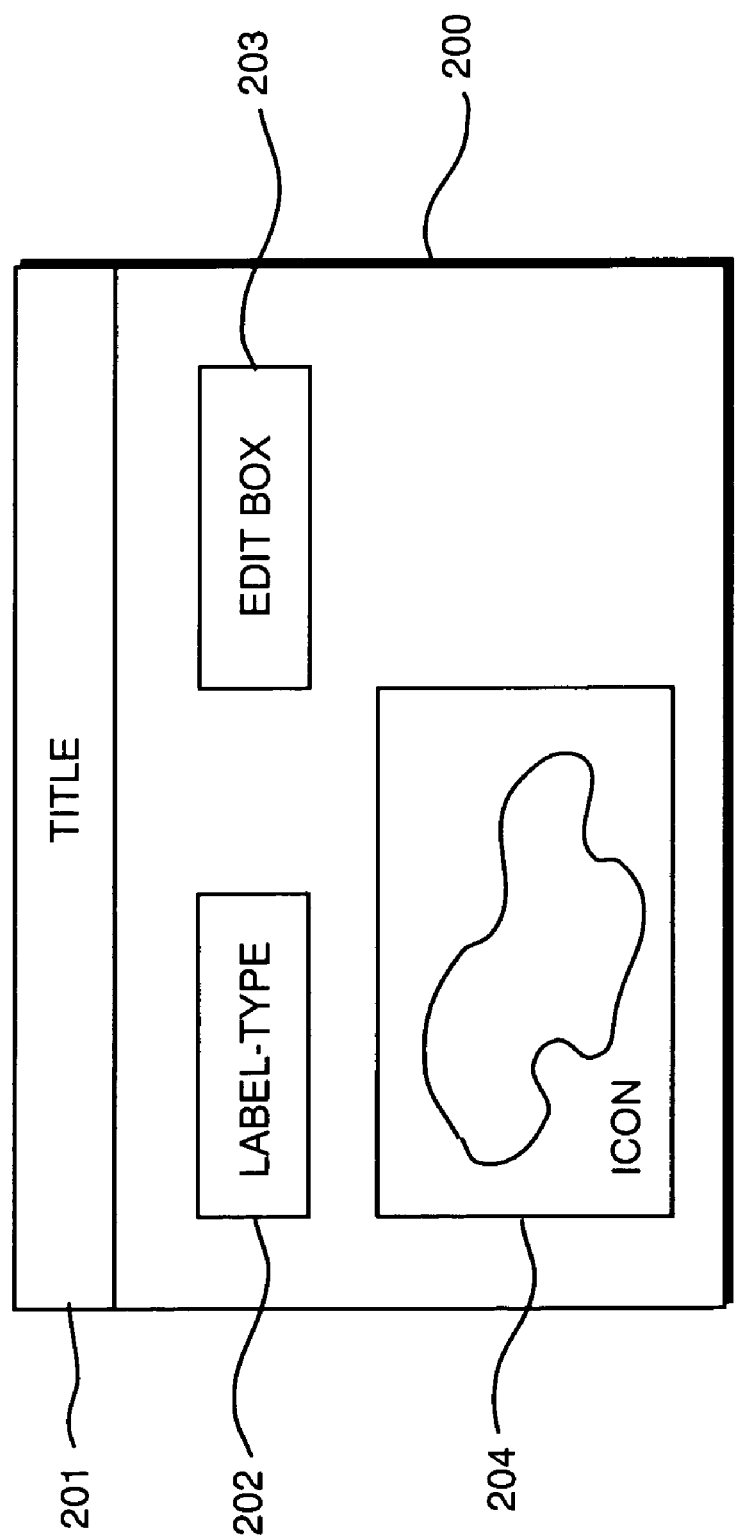
FIG. 2 depicts a dialog box "resource" of the type that could be seen on a computer terminal screen including various resources such as the edit box that appear in that dialog box.

Referring to FIG. 2 there is depicted dialog box resource 200 containing resources: title bar 201, label/type box 202; edit box 203; and icon or splash-screen box 204 with icon therein. This is intended to be representative of the kind of display that a human user views on his/her computer terminal and may appear in various contexts such as programs to be run, empty resource boxes to be filled-in, or home pages to be viewed and responded-to. It is to be understood that other formats for dialog boxes are extant and that more resources than those shown are available and included within the scope of the present invention. It is to be further understood that the expression of these GUI resources is not limited to any particular computer language or operating system. Those GUI resources as well as any other non-GUI resource can be expressed in any application software including but not limited to Windows, UNIX, JAVA, etc., whereby the present invention is not limited to any particular kind of resource nor any particular kind of computer language or operating system.

Referring to FIG. 3, graphical user interface software is represented by GUI box 301 and is shown juxtaposed both the standard (prior-art) graphical resource software box 302 and the present-invention-related resource manager box 303 to give a clear overview of the difference between the architecture of the present invention and that of the prior art. Resource manager 303 operates automatically to preferably select OEM-customer graphical resources (which are desired) as a function of their availability as depicted by box 305, but if unavailable to select the functionally-equivalent default resource as depicted by box 304. Detailed operation of the resource manager software is discussed hereinbelow.

Figure 4:
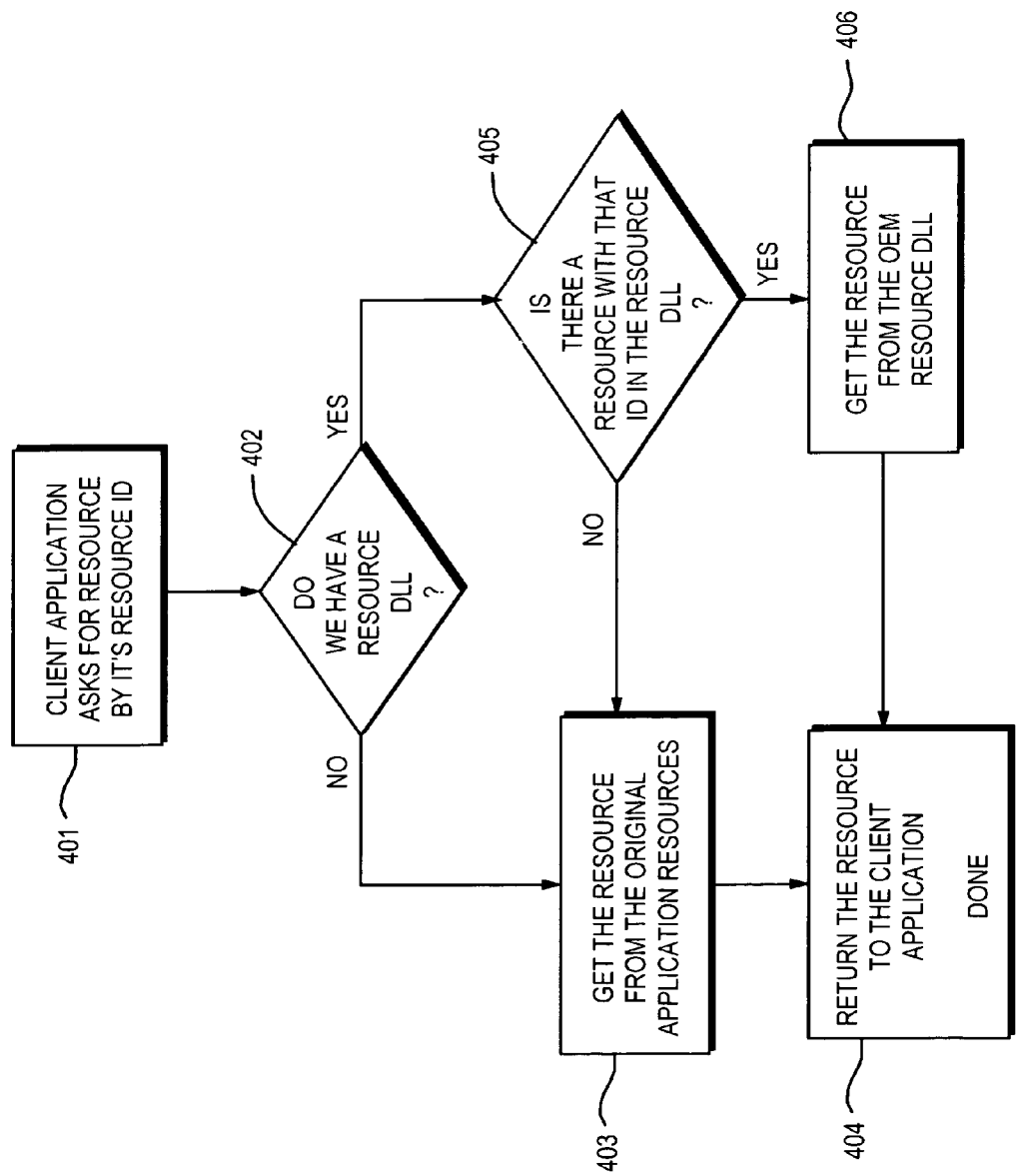
FIG. 4 is a flowchart showing algorithmically how the resource manager software of the present invention operates.

Referring to FIG. 4, a flowchart depicting operation of the algorithm comprising the resource manager software is shown and utilizes software constructs known as dynamic link libraries. In programming terms, a library is generally thought of as a large repository of related binary information and is a convenient way for one programmer to provide such information for use by another programmer. It thus contains a large amount of code all relating to some specific job, task, function or usage. A static linked library, sometimes called an archive, does not get linked to other code or programs until a human programmer decides to cause such linkage, but a dynamically linked library (DLL) gets linked automatically to other code or programs normally at runtime when a customer/user of CAS first runs it on its system. DLL's are also referred to as either runtime-linked or late-linking or late-binding libraries. Typically, DLL's are supplied on a compact disk (CD) along with application code (executables).

In general, in the present invention, software developers' source code is excluded from the customized DLL. However, certain circumstances may arise in which the developers create certain limited source code in response to their own design requirements and/or in response to customer requirements which is essentially unrelated to the main body of the software developers' source code. This unrelated source code may get included in the customized DLL as a matter of convenience or design choice. Because it is unrelated to the main body of source code it does not involve that source code in any bug fixes to which it relates or for which it is responsible.

More specifically, a particular preferred embodiment excludes all software developers' source code from the customized DLL, which therefore completely de-couples any fixes for such source code from fixes related to the customized DLL and vice versa. However, as noted, certain limited categories of other types of source code could exist in the customized DLL such as source code logic that comprises a specific routine for a particular OEM-customer and which has been placed in the customized DLL as a matter of convenience for such customer. An example of such a routine would be one which controls a reset button on a dialog box by checking host computer conditions before making the reset button active if a host computer is not talking to (reading from and/or writing to) a disk array or making the reset button inactive if the host is talking to the array. This routine, although appearing in source code form, is essentially functionally-unrelated to developers' source code and to customized resources contained in the customized DLL, and therefore does not affect the decoupling of any fixes affecting the customized DLL from fixes affecting the developers' source code.

In FIG. 4, block 401 shows that the client application (CAS) functions in a manner to locate a particular resource by its identification number (ID). In other words, at runtime, the CAS supplied to the customer/user is run on the customer/user's computer system at which time a desired, customized resource such as that particular customer/user's dialog box, for example, is requested automatically by operation of the software program because the customized DLL is dynamically linked to the CAS. That particular resource is identified by a unique decimal number associated only with it and with its corresponding default resource to be discussed below. The algorithmic process moves to decision block 402 and determines whether or not a resource-containing DLL is available. If so, the algorithmic process moves to decision block 405 to determine if there is a resource in that DLL with the ID number corresponding to that resource sought by operation of the client application in block 401. If "yes" then the algorithmic process moves to block 406 and obtains that resource from that customized OEM or user DLL, and moves thereafter to block 404 where that resource is returned to the client application (i.e., where, in the example being used herein that desired resource appears on the computer terminal as the OEM-specified dialog box).

As noted above use of the same ID number to identify both the desired customized resource and the definitely-available, functionally-equivalent default resource ensures that at least a functionally-equivalent resource shall be obtained in response to each request. (Accordingly, customized resource ID#'s, if fewer than default resource ID#'s, will necessarily be a subset of the default resource ID#'s.) The desired customized resource is expected to be found in the OEM's DLL, (sometimes written as or designated "OEM.DLL" when working with Microsoft's Visual C++ language and Microsoft software, although the present invention is by no means limited to any specific language or software type). The functionally-equivalent default resource is definitely available from the default DLL (and designated in the software development operation of the assignee of the present invention as "NAVIMGR.DLL"). Accordingly, the number of customized resources are less than or equal to the number of default resources. In accordance with the best mode now known for practicing the present invention decimal numbers are used to identify desired OEM customer/user resources and their respective equivalents, although other than decimal numbers could be used. For example, in FIG. 2, the reference numbers 200–204 which refer to individual resources could be chosen to be the very decimal numbers coded and implemented in the application software to identify those respective resources. As an added benefit to assigning ID numbers, each resource with its own designation can be assigned to one or a limited number of software developers thereby reducing the probability of other developers on the team from interfering when writing code with respect to a particular resource. Resource number ranges can also be useful, because a particular class of resources, such as dialog boxes for example, can be designated decimal numbers within a particular range lending a semblance of order if there are a huge number of resources of multiple types to manage which is not atypical.

Returning to decision block 405, if the other result, "no", had been obtained, then the algorithmic process moves to block 403 which represents operation of the code in its obtaining the equivalent default resource from the original application. Thereafter, the algorithmic process moves to block 404 and returns the resource (in this instance the default resource) to the client or OEM customer/user application.

Returning finally to decision block 402, again if the other result, "no", had been obtained then no OEM-supplied DLL exists and the algorithmic process moves to block 403 whereupon all resources obtained are default resources from the default DLL and thereafter moves to block 404 and returns the resources (in this instance all default resources) to the client application. The default DLL is dynamically linked to the CAS. Of course this entire algorithm is repeated as many times as is required to obtain all resources (desired or default) needed.

Referring next to FIG. 5, there is shown two dialog boxes that would be created at "run time". The box on the left depicts the software developer's default resources and would be created as is only if there is no user or customized OEM.DLL or if it does exist and there are no desired resources in it. That box is compared with the box on the right which shows a generic OEM customer's specified resources which would be created as is, if every desired resource is available in such OEM.DLL. In dialog box 500 there is shown title bar 501, type box 502, edit box 503 and icon box 504 with developer's icon. Similarly, in dialog box 510 there is shown title bar 511, type box 512, edit box 513, and icon box 514 with OEM's icon. The developer's default DLL name shown in this instance is NAVIMGR.DLL under which is listed an example of resource ID numbers associated with their respective default resources: For example, ID #1 is associated with the title bar and the default name stored in this DLL for the title bar is NAVISPHERE. (These are actual names used by the assignee of the present invention.) By comparison, the generic OEM customer's DLL name is OEM.DLL under which is listed another example of resource ID numbers associated with their respective desired resources. For example, ID #1 in this case is likewise associated with the desired title bar and the generic desired name stored in this DLL for the title bar is OEM MANAGER. Without discussing them in detail, similar commentary applies to both sets of ID#'s 2, 3, 4 and 5 shown in FIG. 5 under the two DLL headings shown. As earlier noted, strings, bitmaps, edit boxes, splash-screen icons, etc. are all resources in the GUI context, and as will be understood by those skilled in this art, a team of programmers can write code by physically typing-in at their respective computer terminals source code in the chosen computer language, in this case Visual C++, by using a "dialog editor".

A dialog editor is another program which is used to establish at design time which particular resource will be "assigned" to which particular "string" (i.e. which ID# it will have). In our example, the dialog editor is used to assign: (a) "Title" to string ID #1; (b) "type or label" to string ID #2; (c) "edit box" to string ID #3; and (d) "icon" to string ID #4. These assignments are established for both default resources to be stored in NAVIMGR.DLL and for all corresponding OEM customers' resources, and the same ID#'s are used for their corresponding resources.

Referring next to FIG. 6, there is presented the actual code needed to use the algorithm shown in FIG. 4. As noted, this code is written in Microsoft's Visual C++ language, as a preferred method of implementation. However, as earlier noted, other languages could be used. For example, JAVA is another language which could be used to readily implement this code. In FIG. 6, the code shown is intended to be exemplary and not necessarily complete; more code could be shown and used to accomplish additional tasks. As those skilled in the art of programming in the Visual C++ language will understand, four lines of code are shown that specify resource related commands and are identified by numerals 601, 602, 603, and 604. Code line 601 creates the resource manager; code lines 602 and 603 asks the resource manager to do work; code line 604 destroys the resource manager. Detailed discussion of this is presented below. The double slash syntax "//" signifies that what follows is a message or comment for humans that explains the next line of code; such a message or comment appears immediately ahead of each of the above-noted lines of code for that purpose. Therefore, comment line 606 signifies that line of code 601 is intended to initialize the resource manager. In line of code 601 where the resource manager is created there is a pointer to the resource manager indicated by "*pRscMgr".

Comment line 607 signifies that line of code 602 is to fetch a string from the resource manager. The variable "pRscMgr" is a pointer to the resource manager; the "->Get String" and particularly the "->" arrow syntax means: "ask the resource manager to get the string that has a particular name. In this case, that particular name is "IDS_NFX_APPLICATION_TITLE" which is actually an ID#. In other words, line of code 602 is "asking" the resource manager to fetch a particular resource with a particular ID#. And this line of code, particularly from the arrow syntax to the end of the line, has the property of pulling-in the subroutine or function call represented by the entire flowchart of FIG. 4.

Accordingly, such subroutine will first seek out the OEM/customer resource with that ID# and, if available, will return it. In our GUI context example, it will be used by appearing on the computer terminal screen in the title bar; if unavailable, the functionally-equivalent default string will appear. This is expressed by comment or message line 609.

Comment line 608 signifies that line of code 603 is to fetch a bitmap from the resource manager. The discussion with respect to this line of code and its syntax is similar to the foregoing discussion with respect to line 602 where detailed repetition is not needed. However, the portion of the code: "HBITMAP hBitmap" means "declare a variable of type—Handle to a Bitmap—which gives a placeholder for a bitmap. Again the subroutine of FIG. 4 is called and it will return the OEM bitmap if available in the OEM.DLL and if unavailable will return the default bitmap. The bitmap (either default or desired) is used by its incorporation into the visual display on the computer terminal as a splash-screen. This is expressed by comment line 609.

After the resource manager has obtained all resources requested of it, it has to be retired. Comment line 610 signifies that line of code 604 shall deinitialize the resource manager. Line of code 604 is the functional opposite of line of code 601 and contains the word "Destroy" in place of the word "Create" appearing in line of code 601. As understood by programmers skilled in this language, lines of code in FIG. 6 shall appear in multiple places throughout the CAS, possibly in thousands of places throughout such application software. And each time these lines of code appear, the algorithm of FIG. 4 is employed to seek the desired customized resource and in its absence to supply the equivalent default resource.

Figure 7:
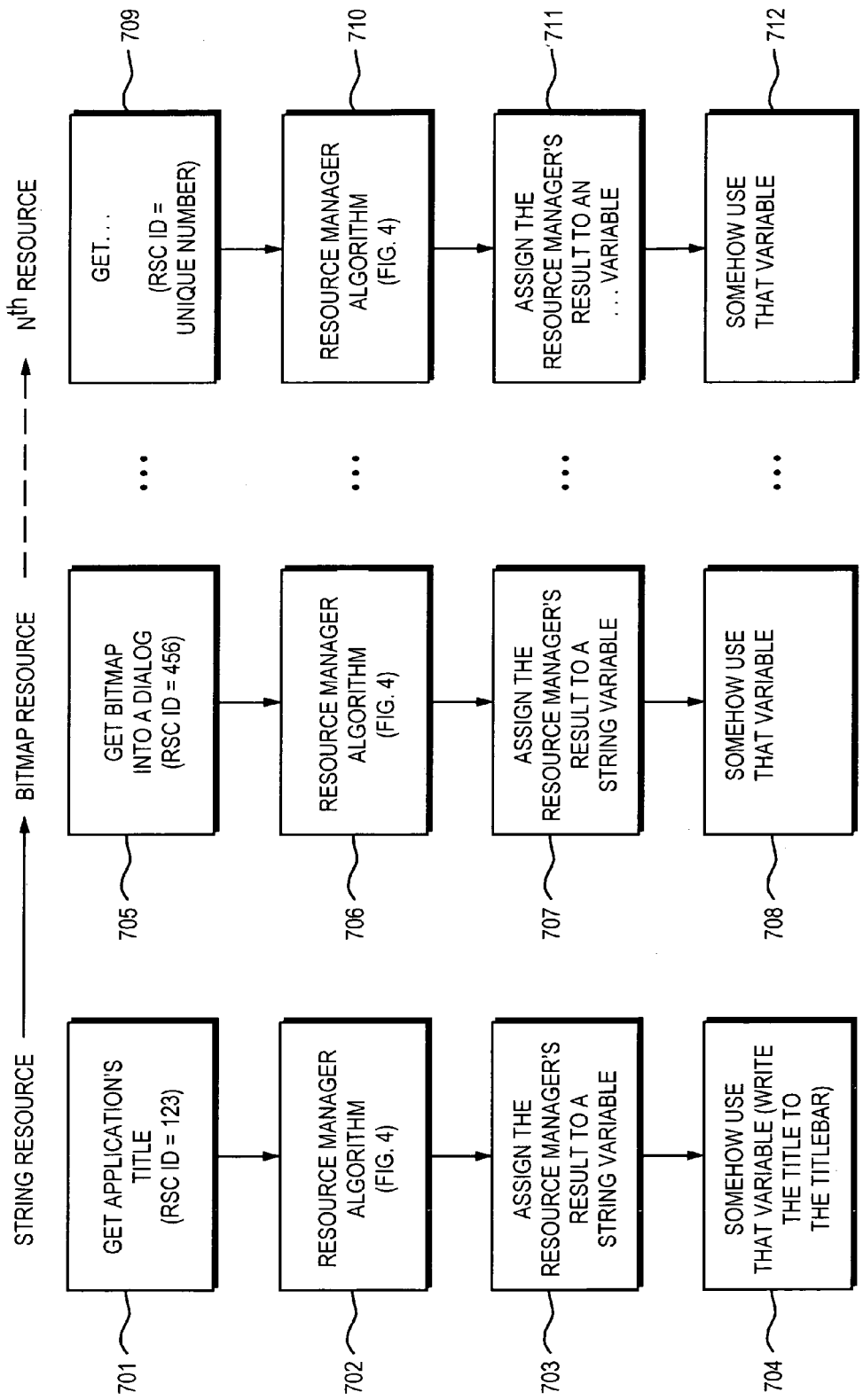

Referring next to FIG. 7, operation of code of FIG. 6 incorporating the algorithm of FIG. 4 is depicted with respect to an undefined number "N" of resources. Again, this is an exemplary presentation and is not intended to delimit the present invention. At the left of the Figure, a titlebar string resource is sought. Operation of the code with respect to block 701 is a command to get the application's title, such resource being represented by ID# 123; this is equivalent to line of code 602 of FIG. 6. In box 702, the resource manager algorithm is called into play (the entirety of FIG. 4). In box 703 the result of operation of the algorithm is assigned to a string variable which is represented in code line 602 by: "CString csDisplayName". And in box 704 somehow that variable is used and in this case is used by writing the title to the titlebar space on the computer terminal screen.

After completion of the steps involved in obtaining the string resource, FIG. 7 shows that the next desired resource is sought, which in this example is a bit map Again, operation of the code with respect to box 705 is a command to get a bit map into a dialog. In this case the resource has ID# 456. Again, in box 706, the resource manager algorithm is called into play (the entirety of FIG. 4). In box 707 the result of operation of the algorithm is assigned to a variable which is represented in code line 603 by "HBITMAP hBitmap". And in box 708, somehow that variable is used and in this case is used by writing a splash-screen in the appropriate location on the computer terminal.

After the bitmap resource has been obtained, the next desired resource is sought and so on until the last (the Nth) resource is sought and obtained. The boxes 709, 710, 711, and 712 function similarly to their equivalent boxes in the diagram.

The present embodiments are to be considered in all respects as illustrative and not restrictive. As noted earlier, the present invention can be implemented in any suitable computer language such as JAVA or with any suitable operating system such as UNIX. And the resources sought need not be limited to GUI resources but can be any kind of customized resource that is desired by a customer. Thus any apparatus or methodology which customizes the CAS with such customized resource for and by such customer at runtime, by operating upon those resources at runtime and which were installed at design time is intended to be included within the scope of the present invention. Thus, the scope of the present invention is indicated by the appended claims rather than by the foregoing illustrative description, and all changes which come within the meaning and range of equivalency of the claims are therefore intended to be embraced therein.

What is claimed is:

1. A method to be practiced by a team of software developers for preparing a computer software kit for uninstalled shipment to a particular user, said software automatically customizing at runtime said method comprising the steps of:
    (a) each member of said team writing certain source code to obtain his/her respective contribution to said software in an uncustomized source code state;
    (b) each member of said team compiling said respective contribution to obtain an uncustomized file of its corresponding contribution in object code;
    (c) each member of said team linking each said obtained uncustomized file into a single module containing linked and uncustomized object code;
    (d) repeating steps (a) through (c) for each said module required to be obtained and thereby obtaining all required modules; and,
    (e) packaging into said computer software kit for uninstalled shipment to said particular user both (i) said all required modules and (ii) a dynamic link library customized in accordance with a specification of said particular user, said library being dynamically linked to at least one of said all required modules to automatically customize, by a resource manager, said all required modules at said runtime;
    wherein said dynamic link library contains GUI resources in accordance with said specification of said particular user.

2. The method of claim 1 and wherein said dynamic link library excludes any of said source code.

3. The method of claim 2 and wherein said dynamic link library contains foreign language resources in accordance with said specification of said particular user.

4. The method of claim 2 and wherein said dynamic link library contains non-English alphabet resources in accordance with said specification of said particular user.

5. The method of claim 1 and wherein said GUI resources include at least one string.

6. The method of claim 1 and wherein said GUI resources include at least one bitmap.

7. The method of claim 1 and wherein said GUI resources include at least one dialog box.

8. The method of claim 1 and wherein said GUI resources include at least one icon.

9. The method of claim 8 and wherein said icon is a splash-screen icon.

10. A method for preparing a computer software kit for uninstalled shipment to a particular user, said software automatically customizing at runtime, said method comprising the steps of:
    (a) writing certain source code to obtain a portion of said software in an uncustomized source-code state;
    (b) compiling said portion to obtain an uncustomized file of said portion in object code;
    (c) repeating steps (a) and (b) as many times as necessary to obtain all necessary uncustomized files of their respective portions in object code;
    (d) linking said all necessary uncustomized files into a single module to obtain linked and uncustomized object code;
    (e) repeating steps (a) through (d) for each said module required to be obtained and thereby obtaining all required modules; and,
    (f) customizing said computer software kit for uninstalled shipment to said particular user by packaging therein both (1) said all required modules, and (2) a user dynamic link library customized in accordance with a specification of said particular user, said library being dynamically linked to at least one of said all required modules to automatically customize, by a resource manager, said all required modules at said runtime;
    wherein said dynamic link library contains GUI resources in accordance with said specification of said particular user.

11. The method of claim 10, and wherein said computer software further includes:
    (a) storing, in a default binary file, default information functionally corresponding to said user information stored in said user dynamic link library; and,
    (b) selecting, by way of resource manager software, said user information when available and said default information functionally corresponding thereto when said user information is unavailable.

12. The method of claim 11 and wherein said binary file is a dynamic link library.

13. The method of claim 12 and wherein operation of said resource manager software is under control of said user at run time.

14. The method of claim 11 and wherein said selecting step selects said functionally-corresponding default information by matching the ID# of said default information to the ID# of said user information.

15. The method of claim 12, and wherein said dynamic link library excludes any of said source code.

16. The method of claim 10 and wherein said GUI resources include at least one string.

17. The method of claim 10 and wherein said GUI resources include at least one bitmap.

18. The method of claim 10 and wherein said GUI resources include at least one dialog box.

19. The method of claim 10 and wherein said GUI resources include at least one icon.

20. The method of claim 19 and wherein said icon is a splash screen icon.

21. In a computer system, a method for customizing application software running in said system comprising the steps of:
    (a) establishing a default binary file containing a first plurality of default resources dynamically linked to said application software;
    (b) concurrently establishing a customized dynamic link library in accordance with a specification of a particular user, containing a second plurality of customized resources dynamically linked to said application software, said second plurality being smaller than or equal to said first plurality;
    (c) said application software including resource manager software separate from said default binary file first accessing, at runtime, said customized dynamic link library to obtain a desired one of said customized resources for further usage by said computer system;

(d) if said desired one of said customized resources is available from said customized dynamic link library, repeating step (c) to obtain the next desired one of said customized resources and in a repetitive manner until all desired customized resources are obtained or until any said next desired one of said customized resources is unavailable;

(e) if said desired one or any said next desired one of said customized resources is unavailable from said customized dynamic link library thereby being an unavailable customized resource, then said resource manager software next accessing said default binary file to obtain a certain one of said first plurality of default resources being the functional equivalent of said unavailable customized resource; and, (f) repeating steps (c), (d) and (e) until all available said all desired customized resources are obtained from said dynamic link library.

22. The method of claim 21 and wherein said binary file is a dynamic link library.

23. The method of claim 21 and wherein said second plurality is a subset of said first plurality when said second plurality is less than said first plurality.

24. The method of claim 21 and wherein said GUI resources include at least one string.

25. The method of claim 21 and wherein said GUI resources include at least one bitmap.

26. The method of claim 21 and wherein said GUI resources include at least one dialog box.

27. The method of claim 21 and wherein said GUI resources include at least one icon.

28. The method of claim 27 and wherein said icon is a splash-screen icon.

29. The method of claim 21 and wherein said application software excludes source code.

30. The method of claim 29 and wherein said GUI resources include at least one string, bitmap, dialog box, or icon.

31. The method of claim 21 and wherein said next assessing step obtains said functional equivalent by matching the ID# of said unavailable customized resource to the ID# of said certain one of said first plurality of default resources.

32. The method of claim 21 and wherein said first plurality and said second plurality of resources are selected from the group consisting of foreign language resources and non-English alphabet resources.

33. In a computer system, apparatus for customizing application software running in said system comprising:
means for establishing a default binary file containing a first plurality of default resources dynamically linked to said application software;
means for concurrently establishing a customized dynamic link library, in accordance with a specification of a particular user, containing a second plurality of customized resources dynamically linked to said application software, said second plurality being smaller than or equal to said first plurality; and,
resource manager means separate from said default binary file including first means for first accessing, at runtime, said customized dynamic link library to obtain all desired said customized resources, second means for detecting unavailability of any one of said desired resources, third means responsive to operation of said detecting means detecting said unavailability for stopping the operation of accessing said customized dynamic link library and for accessing said default binary file to obtain the functional equivalent of said one unavailable resource, and fourth means responsive to obtaining said functional equivalent for returning access control to said first means;
wherein said default binary file is a default dynamic link library; and
wherein said default dynamic link library and said customized dynamic link library contain GUI resources.

34. The apparatus of claim 33 and wherein said second plurality is a subset of said first plurality when said second plurality is less than said first plurality.

35. The apparatus of claim 33 and wherein said GUI resources include at least one string, bitmap, dialog box, or icon.

36. The apparatus of claim 33 and wherein said customized dynamic link library contains no source code and contains GUI resources.

37. The apparatus of claim 36 and wherein said GUI resources include at least one string, bitmap, dialog box, or icon.

38. The apparatus of claim 33 including:
means for establishing a first set of ID #'s for said first plurality of default resources and a second set of ID #'s for said second plurality of customized resources;
means for assigning each one of said ID #'s from said first set to each one of said default resources respectively and for assigning each one of said ID #'s from said second set to each one of said customized resources respectively and in a manner so that any selected one of said customized resources with a particular functionality will have the same ID # as a particular one of said default resources having functionality equivalent to said particular functionality.

39. The apparatus of claim 33 and wherein said default dynamic link library and said customized dynamic link library contain resources selected from the group consisting of non-English language resources and foreign alphabet resources.

* * * * *